United States Patent [19]

Ban

[11] Patent Number: 4,755,728
[45] Date of Patent: Jul. 5, 1988

[54] SINGLE-PHASE SEMICONDUCTOR ELECTRIC MOTOR AND FAN USING THE SAME

[76] Inventor: Itsuki Ban, 3-50-18 Higashi-Ohizumi, Nerima-ku, Tokyo, Japan

[21] Appl. No.: 96,531

[22] Filed: Sep. 15, 1987

[30] Foreign Application Priority Data

| Sep. 16, 1986 [JP] | Japan | 61-215876 |
| Nov. 20, 1986 [JP] | Japan | 61-275239 |
| Dec. 3, 1986 [JP] | Japan | 61-286674 |

[51] Int. Cl.⁴ .................................. H02P 6/02
[52] U.S. Cl. ........................................ 318/254
[58] Field of Search ............. 318/138, 254, 293, 294, 318/439; 310/62, 63, 68 R; 361/23

[56] References Cited

U.S. PATENT DOCUMENTS

| 4,164,690 | 8/1979 | Muller et al. | 318/254 |
| 4,325,095 | 4/1982 | Hart | 361/23 |
| 4,360,751 | 11/1982 | Arnold, Jr. et al. | 310/63 X |
| 4,459,087 | 7/1984 | Barge | 318/254 X |
| 4,504,751 | 3/1985 | Meier | 318/254 X |
| 4,514,666 | 4/1985 | Suzuki | 318/293 |
| 4,553,075 | 11/1985 | Brown et al. | 318/254 |
| 4,563,622 | 1/1986 | Deavers et al. | 318/254 |

*Primary Examiner*—Bentsu Ro
*Attorney, Agent, or Firm*—Lorusso & Loud

[57] ABSTRACT

A single-semiconductor motor fan comprises a cylinder; a fixed armature with the central portion fitted over the lower end of the outer periphery of the cylinder and having a plurality of salient poles; a plurality of single-phase armature coils mounted on the armature; bearings fixed on the inner periphery of both ends of the cylinder; a rotary shaft rotatably supported by the bearings; a cup-shaped rotor fixed on the upper end of the rotary shaft; an annular magnet fixed on the inner surface of the rotor and magnetized into N and S poles having the same pitch as those of the salient poles, the N and S magnetic pole surfaces facing the salient pole surfaces with a space therebetween; a radial fan composed of a plastic cylinder fitted over a protruding portion of the rotor and a plurality of plastic plates extending radially outwardly of the cylinder, the height of the radial fan not exceeding the height of the protruding portion of the rotor; a position detecting element for detecting the position of the magnet of the rotor and producing a single-phase position detecting signal; an energization controlling circuit for energizing the armature coil and producing a unidirectional torque by the position detecting signal; and a self starting means for producing an output torque at a dead point by virtue of a cogging torque.

13 Claims, 13 Drawing Sheets

SINGLE-PHASE SEMICONDUCTOR ELECTRIC MOTOR AND FAN USING THE SAME

BACKGROUND OF THE INVENTION

1. Field of the Invention

The present invention relates to a single-phase semiconductor motor and a fan using the same and, more particularly, to a fan which is used as a small-sized brushless electric fans for refluxing the air in the interior of a car to a temperature sensor of a car air conditioner and as a cooling fan for a personal computer and a computer circuit, and which is also effective as a small-sized fan for locally cooling, and to a single-phase semiconductor electric motor which is effective as a drive source of a light load.

2. Related Art Statement

As the above-described type fan, there is known a fan having an outer diameter of about 30 to 40 mm provided on a rotary shaft of a known DC commutator motor having an outer diameter of 20 mm to 30 mm. There is also known a brushless motor having this structure. A small fan provided at the central portion of an outwardly rotation type rotor so as to make the total apparatus small and flat is disclosed in, for example, U.S. Pat. No. 4,563,622.

Each of the above-described fan motors, however, has the following problems. Firstly, if it is a commutator motor, it includes a mechanically worn portion which makes the durability short, so that it is difficult to have a life of not less than 20,000 hours, which is generally required.

A second problem is that the fan motor generates mechanical noise. If it is used as a conventional brushless motor, the first and second problems are solved, but it brings about a third problem of raised cost and enlargement of the size. Fourthly, if it is formed into a single-phase brushless motor to make it small-sized at a low cost, the efficiency is greatly degenerated.

These problems in the above-described conventional single-phase semiconductor motor are derived from the fact that when it is rotated by an electrical angle of 180 degrees, an excessive rotor current flows at the initial stage and the last stage, especially at the last stage because the counter electromotive force is zero at this time, so that the joule loss which does not contribute to torque is increased, which leads to the lowering of the efficiency.

A technique for preventing this inconvenience is disclosed in U.S. Pat. No. 3,299,335, but in this technique, since it is impossible to effectively utilize all the magnetic fields of the magnet rotor, the coil utilization is reduced by half, the output torque being disadvantageously lowered.

The fan motor disclosed in U.S. Pat. No. 4,563,622 has a fifth problem that since the magnet of the magnet rotor is thin and the torque generated by driving the armature is small, the output torque is small.

A sixth problem of such a fan motor is that it is difficult to be made to have a flat structure except by using the technique in U.S. Pat. No. 4,563,622, and that it is difficult in common to make the diameter of the fan motor small.

SUMMARY OF THE INVENTION

The above-described drawbacks in the prior-art apparatus have been successfully eliminated by the present invention.

The present invention has solved the first and second problems by making a motor of a brushless type. The third, fifth and sixth problems have been solved by attaching a plastic fan on the upper surface of a cup-shaped rotor to form a radial fan, thereby making the fan motor small and flat, by using a single-phase armature coil to make the drive circuit at a low cost and by generating a torque by full-wave drive of all coils, thereby increasing the output torque.

The motor is not energized by an electrical angle of 180 degrees, but at the last energizing stage energization is interrupted by an electrical angle of 30 degrees, so that the efficiency is raised to not less than 60%, thereby solving the fourth problem.

The above-described means of the present invention can eliminate the problems, namely, the defects in the prior art.

That is, the mechanical and electric noise is reduced, the efficiency is enhanced, it is possible to produce a flat and light fan motor at a low cost, and it is possible to use a fan having a diameter of not more than 40 mm. Since it is a semiconductor motor, the life may be prolonged to not less than 20,000 hours.

At the initial stage of energizing the armature coil when the current does not contribute to the torque, in the case of a motor having a magnetic core, since the time constant of the armature coil is large, the rise of the current is comparatively slow, the current value is small and the joule loss is also small, so that the influence on the efficiency is small, while at the last energizing stage, a large amount of current flows and the strong magnetic flux almost saturates the core, thereby providing an inductance almost equivalent to an air-core coil and reducing the time constant of the armature. Therefore, at the last energizing stage, an armature current almost the same as that at the starting time flows, and this current does not contribute to the torque and all becomes a joule loss, thereby lowering the efficiency to such a great extent as 20 to 25%.

In the apparatus of the present invention, since the energization is cut off at the last energizing stage, the unavailable loss is not generated and the efficiency takes a value of not less than 60%. An energization controlling circuit facilitates the starting of the motor by energizing the armature coil by an electrical angle of 180 degrees at the time of start-up.

Since a radial fan is placed on the upper surface of the motor, it is possible to obtain a small and flat fan motor. Since bearings are inserted into a radial fan portion and it is possible to so design that the distance between the bearings is as long as possible, the axial deviation is small and the life is prolonged. It is also possible to vary the direction of air stream and thereby to obtain a motor of this kind for multiple uses by varying the outer housing of the rotor and the radial fan.

These and other objects of the invention will become apparent from the following description of embodiments thereof when taken together with the drawings.

DETAILED DESCRIPTION OF PREFERRED EMBODIMENTS

Figure 1:
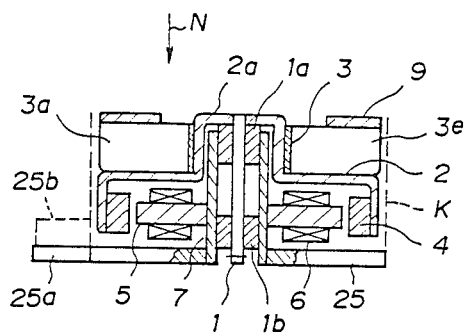
FIG. 1 is a sectional view of an apparatus according to the present invention.

An apparatus of the present invention will be explained in detail hereinunder with reference to the embodiments shown in the accompanying drawings. The same reference numerals in the drawings represent the same elements, explanation thereof being omitted.

Referring first to FIG. 1, which is a sectional view of an embodiment of an apparatus of the present invention, a metal cylinder 7 is embedded and implanted at the center hole of a plastic circular substrate 25. Oilless metal bearings 1a and 1b are inserted into and fixed on the upper and lower end portions of the metal cylinder 7. A rotary shaft 1 is rotatably supported by the bearings 1a and 1b.

Figure 3:
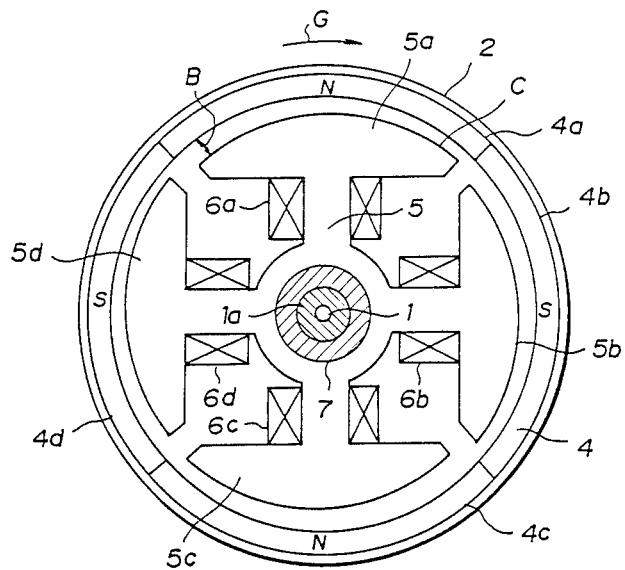
FIG. 3 is an explanatory of an armature.

The center hole of an armature 5 which is shown in detail in FIG. 3 is engaged with the cylinder 7.

The armature 5 is provided with salient poles 5a, 5b, . . . with a space of 90 degrees provided between the adjacent poles, as shown in FIG. 3, and armature coil members 6a, 6b, . . . are wound around the respective poles. The armature coil is represented by the reference numeral 6 in FIG. 1.

The armature 5 is formed by punching a silicon steel plate and laminating the punched plates.

An annular ferrite magnet 4 is pasted on the inside of a cup-shaped rotor 2 which is made by press operation of a soft steel plate. The ferrite magnet 4 has four N and S magnetic poles in total, having an equal width and facing the respective salient poles 5a, 5b, 5c and 5d with a space therebetween.

The central portion of the rotor 2 protrudes in a cylindrical state and the upper end of the rotary shaft 1 is bolted to the central portion of the upper end thereof.

A plastic cylinder 3 is fitted over the protruding cylindrical portion of the rotor 2, and eight plastic fans 3a, 3b, . . . are fixed on the outer periphery of the cylinder 3. The fans 3a, 3b, . . . and the cylinder 3 are molded from a plastic material, and constitute a radial fan.

Figure 2:
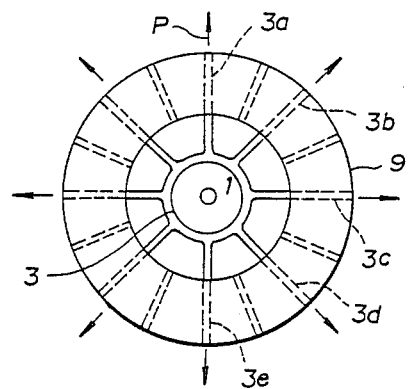
FIGS. 2(a), 2(b), and 2(c) and 2(d) show embodiments of an apparatus according to the present invention having modified outer housings and explanatory views thereof applied to a heat sink.
Figure 2:
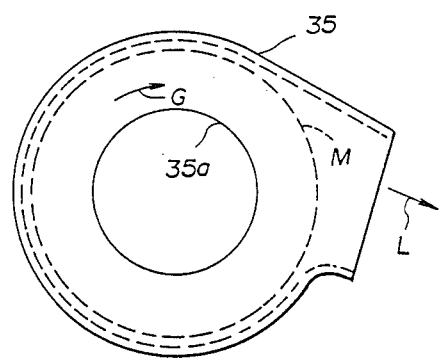
Figure 2:
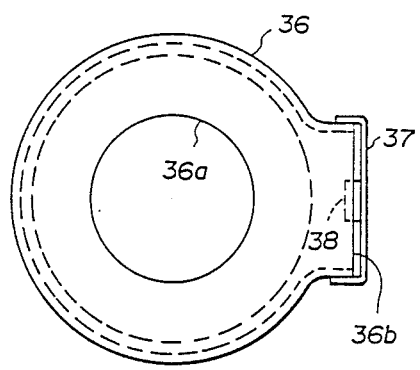
Figure 2:
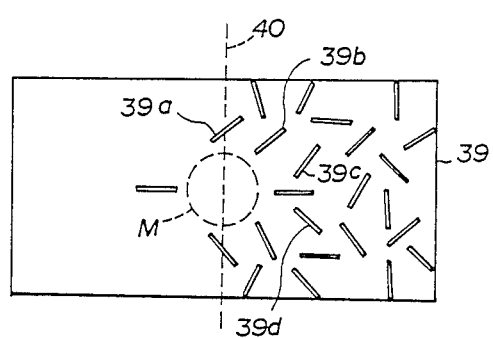

FIG. 2(a) is a sectional view of the apparatus shown in FIG. 1, as viewed in the direction indicated by the arrow N.

The reference numeral 9 denotes a plastic ring fixed on the upper surface of the fans 3a, 3b, . . ., as shown in FIGS. 1 and 2(a).

The fans 3a, 3b, . . ., the ring 9, the cylinder 3 and the rotor 2 integrally rotate, thereby flowing out air in the direction indicated by the arrow P, namely, outwardly.

An electric circuit 25b is mounted on a protruding portion 25a shown in FIG. 1.

A sirocco fan can be constituted by removing the ring 9 shown in FIG. 1, placing an outer housing 35 shown in FIG. 2(b) over the rotor 2 and the fans 3a, 3b, . . . as indicated by the dotted line K in FIG. 1, and fixing an opening portion on the outer periphery of the substrate 25.

FIG. 2(b) shows this apparatus as viewed in the direction indicated by the arrow N in FIG. 1.

In FIG. 2(b), a hole 35a serves as an air inlet, and air stream is produced in the direction indicated by the arrow L from the opening portion on the righthand side.

Although the fans 3a, 3b, . . . are arranged in the radial direction, the air flow is increased by inclining them obliquely from the radial direction like a known sirocco fan. The dotted line M represents the motor shown in FIG. 1, and the arrow G indicates the rotating direction of the rotor 2.

FIG. 2(c) shows a modification of the sirocco fan shown in FIG. 2(b). The air outlet of the outer housing 35 in FIG. 2(b) is modified in an outer housing 36 in FIG. 2(c). A hole 36a is an air inlet, and air flows out of the air outlet on the righthand side. A temperature sensor 38 is fixed on a support lever 37 with both ends thereof fixed on the righthand hole 36b.

In the case of measuring the temperature of the room and adjusting the room temperature on the basis of the measured value, it is necessary to reflux the air in the room to the temperature sensor. The motor shown in FIG. 2(c) is effective for such use.

The motor of the present invention is characterized in that it can be so small and flat as to have a diameter of about 30 mm and a height of about 16 mm.

The apparatus shown in FIG. 2(b) is effective as a fan motor for locally cooling LSI circuits of a micro computer, etc.

The fan motor having air stream all around the fan motor such as that shown in FIG. 1 can be utilized for forced cooling of a heat sink FIG. 2(d) shows such a state.

The substrate 25 shown in FIG. 1 is bolted to the center of an aluminum bottom plate 39 and heat dissipation fins 39a, 39b, . . . are arranged randomly without alignment unlike known fins.

Therefore, the air stream which flows out to the outer periphery of the motor M flows among the fins windingly, so that the cooling effect is five times as large as that of natural convention. In addition, although a cooling fan utilizing natural convection is required to provide the bottom plate 39 in a vertical direction, the apparatus of the present invention is allowed to provide it in any direction, so that it is an effective technique for miniaturizing an electronic machine. Although no aluminum fins are shown on the lefthand side of the dotted line in FIG. 2(d), they are also arranged randomly in the same way as those on the righthand side.

As will be understood from the above explanation, the apparatus of the present invention has the following characteristics.

Firstly, since the protruding portion is formed at the central portion of the rotor 2 in FIG. 1, it is possible to provide the fans 3a, 3b, . . . in a space defined by the protruding portion and the upper surface of the rotor 2, thereby constituting a small and flat motor. This is effective especially as a cooling fan motor.

Secondly, if a motor is made flat in the prior art, the distance of the bearings are generally shortened, thereby increasing the axial deviation and decreasing the durability. In the present invention, however, since the distance including the radial fans 3a, 3b, . . . constitutes the distance between the bearings, as shown in FIG. 1, the axial deviation is reduced and the durability is improved.

Thirdly, it is possible to make a motor fan for multiple uses by using the ring 9, the outer housing 35 and 36 (shown in FIGS. 2(a), 2(b) and 2(c)).

Figure 4A:
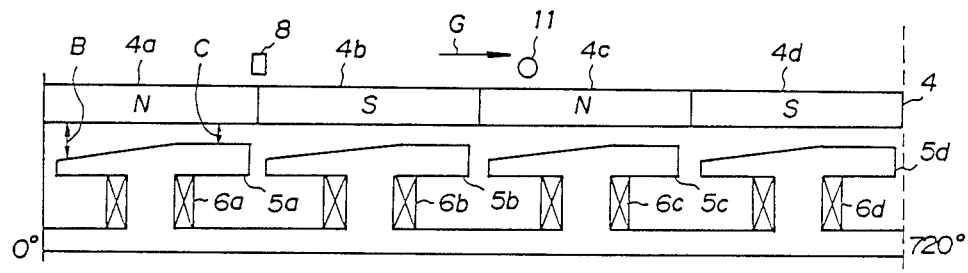
FIGS. 4(a) and 4(b) are developments of a magnet rotor and magnetic poles of emdodiments of the present invention.

FIG. 4(a) is a development of magnetic poles 4a, 4b, . . . of a magnet rotor 4 over 720 degrees by an electrical angle. Salient poles 5a, 5b, . . . armature coils members 6a, 6b, . . . , a Hall element 8 and a coil 11 face the respective members and the magnet rotor 4. In the apparatus of the present invention, since it is necessary that the output induced by the coil 11 has a phase difference of 30 to 40 degrees with respect to the output phase of the Hall element 8, they are positioned as shown in FIG. 4.

Since the salient poles 5a, 5b, . . . have unequal gaps, the cogging torque of the magnet rotor 4 deviates and the magnet rotor 4 stops after rotating by a predetermined angle in the direction indicated by the arrow G, thereby enabling self starting. For this purpose, the salient poles 5a, 5b, . . . have a configuration in which the lower half of the left hand side is bent downwardly. The salient poles shown in FIG. 3 have the same configuration.

Figure 5:
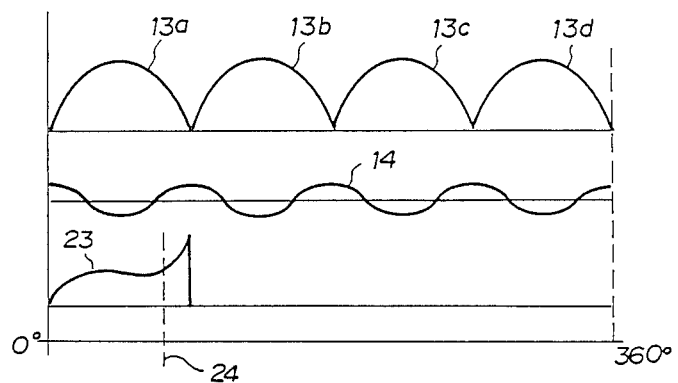
FIG. 5 is a time chart of torque curves and a current curve of an armature.

If the armature coil members 6a, 6b, . . . are reciprocatingly energized whenever the magnet rotor 4 is rotated by 180 degrees by an electrical angle (hereinunder "by an electrical angle" may be omitted), the output torques form the curves 13a, 13b, . . . , respectively, of the time chart in FIG. 5. The above-described cogging torque forms the curve 14 and the dead point extinguishes, thereby enabling self starting.

The above-described conventional single-phase motor has the following drawbacks.

The efficiency is degenerated to such an extent that if the input is about 1 to 2 W, the efficiency becomes 20 to 35%. In comparison with a three-phase motor having an efficiency of 60 to 70%, the efficiency is greatly degenerated.

The apparatus of the present invention has removed the cause for degenerating such an efficiency, and has an efficiency of about 60% by raising it by 20 to 25%. The details will be explained in the following.

One curve of an armature current is represented by the curve 23. The curve 23 will now be explained.

The current of an armature current coil has a slow rise at the initial energizing stage because of a delay in the time constant due to the inductance, and thereafter the counter electromotive force forms a concave portion at the middle portion of the curve 23.

At the last energizing stage, since the magnetic core approaches saturation, the specific permeability rapidly approaches 1, and the inductance suddenly decreases. According to the actual measurement, the inductance of the left end portion of the curve 23 is about 20 mH and that of the right end portion is about 5 mH. This is in the case of a motor having an input of 1 to 2 W. Therefore, since the time constant of the armature coil is suddenly decreased and the counter electromotive force is also suddenly decreased, the armature current increases to approximately the starting current. Thus, the armature current rapidly increases as the right end portion of the curve 23 in FIG. 5. In the vicinity thereof, the output torque is scarcely observed, and unavailable joule loss and the magnetic energy loss are rapidly increased.

The same is the case with other magnetic poles and salient poles.

If the number of rotation of a motor is 3,000 per minute, four curves 23 are obtained at every rotation, so that the motor is energized as represented by 12,000 curves 23 every minute. If extreme expression is used, such a motor is a DC motor which is started 12,000 times every minute, and it will be understood that this is the main cause for introducing the degeneration of the efficiency.

The optimum means for eliminating the above-described defect is to stop energizing the armature current at the point indicated by the dotted line 24 in FIG. 5. In other words, the current had better been cut off at the point indicated by the dotted line 24. The optimum width of the current to be cut off is about 30 to 45 degrees.

The controlling circuit for realizing this will be explained with reference to FIG. 9.

Figure 6:
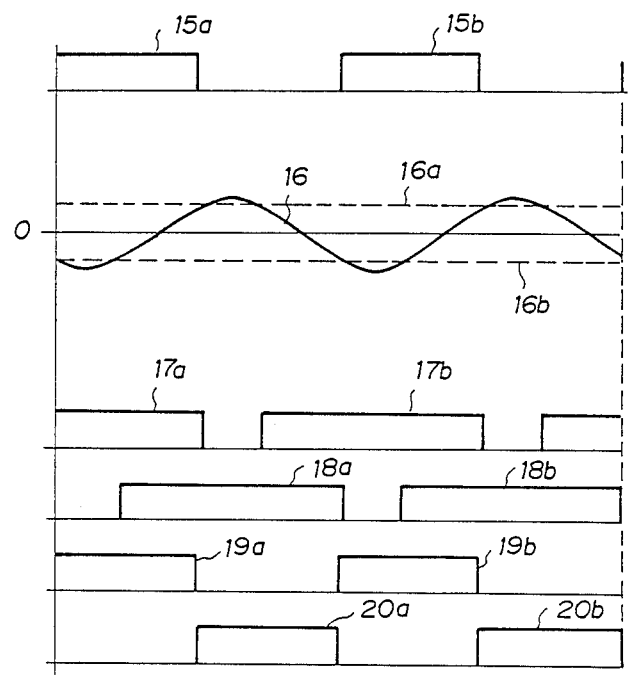
FIGS. 6(a), 6(b), and 6(c) are time charts of position detecting signals and energizing signals of embodiments of the present invention.
Figure 6:
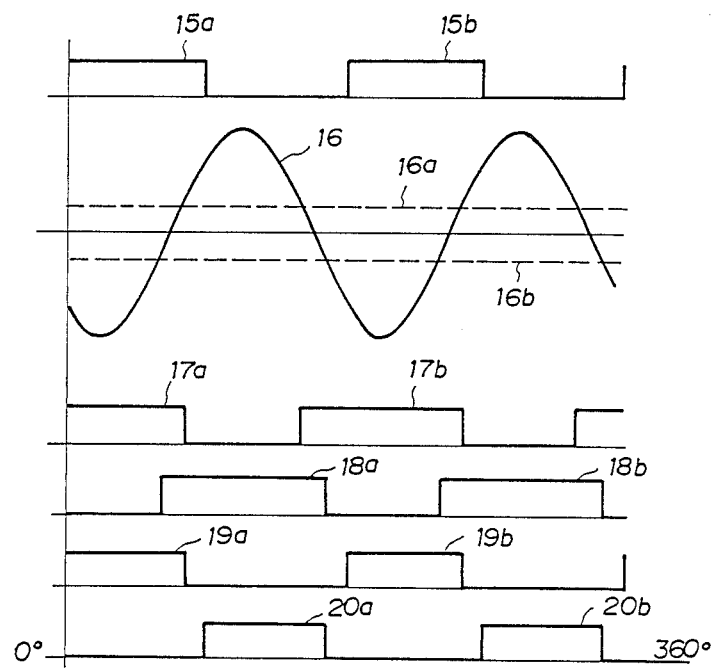
Figure 9:
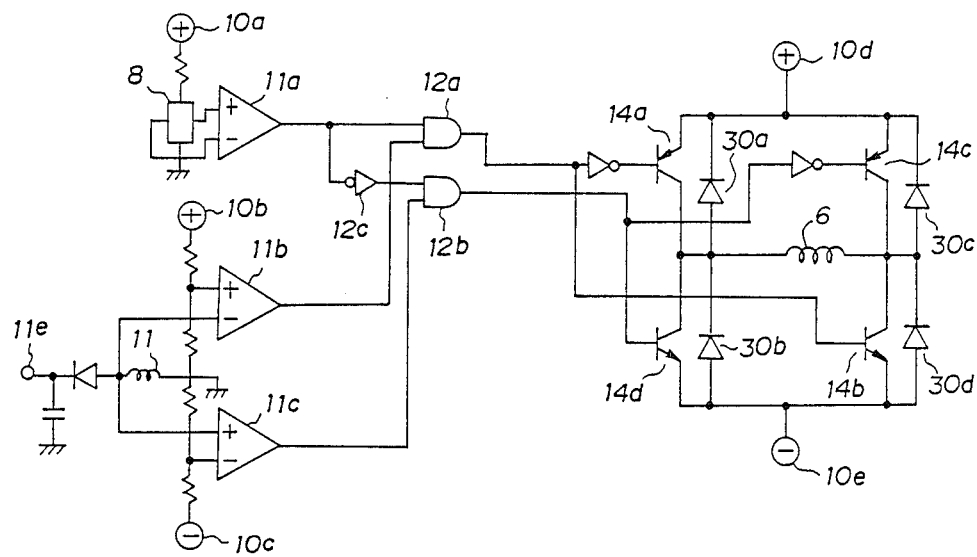
FIG. 9 is a circuit for energizing and controlling an armature coil of the embodiment shown in FIG. 4(a)

In FIG. 9, the output of the Hall element 8 (represented by the same reference numeral in FIG. 4(a)) is shaped by a comparator 11a, and indicated by the curve 15a, 15b, . . . of the time chart at a slow-speed operation in FIG. 6(a).

The induction coil 11 faces the magnetic poles 4a, 4b, . . . , as shown in FIG. 4(a), and the induced output obtained is indicated by the curve 16 in FIG. 6(a). The curve obtained has a phase difference equivalent to the distance between the Hall element 8 and the coil 11. The output waveforms of the comparators 11b and 11c are indicated by the curves 17a, 17b, . . . and 18a, 18b, . . . respectively in FIG. 6(a). The dotted lines 16a and 16b in FIG. 6(a) show the voltages of the non-inversion input terminal and the inversion input terminal of the comparators 11b and 11c, respectively.

The output waveform of an AND circuit 12a is indicated by the curve 19a, 19b, . . . in FIG. 6(a).

The output waveform of an AND circuit 12b which is operated by the input through an inverter 12c and the output of the comparator 11a is indicated by the curve 20a, 20b, . . . in FIG. 6(a). Since the bases of transistors 14a and 14b, and 14c and 14d are controlled by the outputs of the AND circuits 12a and 12b, respectively, the armature coil 6 is alternately energized every time the magnet rotor 4 rotates by 180 degrees, and is driven as a single-phase semiconductor motor. The reference numerals 10b, 10c, and 10d, 10e represent the positive and negative poles of the DC power source.

The output of the AND circuit 12a makes the transistors 14a and 14b conductive and energizes the armature coil 6 to the righthand side, while the output of the AND circuit 12b makes the transistors 14c and 14d conductive and energizes the armature coil to the left-hand side.

The armature coil 6 consists of the armature coil members 6a, 6b, ... shown in FIG. 3 connected in series or in parallel.

The efficiency of the above-described motor which energizes by 180 degrees is low, as described above. In order to improve the efficiency, it is necessary to interrupt the current of the armature at the point indicated by the dotted line 24 in FIG. 5.

Another embodiment will be explained with reference to FIG. 6(b).

The same reference numerals as those in FIG. 6(a) denote the output waveforms at the same points.

FIG. 6(b) is different from FIG. 6(a) in that when the speed exceeds a predetermined value after the start-up to conduct rated driving, the output of the coil 11 increases as shown by the curve 16.

The output of the comparator 11b is therefore indicated by the curve 17a, 17b, ... and that of the comparator 11c by the curve 18a, 18b, ... each of which has a narrower width than those of the respective electric signals represented by the same reference numerals in FIG. 6(a).

The outputs of the AND circuits 12a and 12b are represented by the curve 19a, 19b, ... and the curve 20a, 20b, .... When these waveforms and the output of the Hall element 8, namely, the output of the comparator 11a are compared, it is understood that the curve 19a, 19b, ... and the curve 20a, 20b, ... are alternately obtained, whereby the armature coil 6 is energized reciprocatingly.

Therefore, although the output of the comparator 11a agrees with the rise of the output (15a, 15b, ...) of the Hall element 8 at the initial energizing stage, the width of the output is narrower than the output width of the Hall element 8.

As is clear from the above explanation, at the start-up, since each armature coil member is alternately energized by an electrical angle of 180 degrees, exact start-up is enabled due to the above-described cogging torque. As the speed is increased, the energizing width becomes smaller than 180 degrees, and during the rated driving, the energization is cut off at the position indicated by the dotted line 24 in FIG. 5.

Thus, the efficiency is enhanced and improved by 20 to 25% as compared with a known motor of this kind.

It is possible to select the point for obtaining the highest efficiency by adjusting the heights of the dotted lines 16a and 16b in FIG. 6(b), which are the reference voltages, thereby varying the position of the last energizing stage.

The distance between the coil 11 and the Hall element 8 is determined as described above. The appropriate phase difference at the last stage of the curves 15a and 19a in FIG. 6(b) is about 30 to 40 degrees by an electric angle. It is therefore necessary to select the output (curve 16) of the coil 11, the reference voltages (dotted lines 16a and 16b), and the distance between the coil 11 and the Hall element 8 so that the phase difference takes such a value.

As the rotational speed becomes higher, the width of the curves 17a, 17b, ... become narrower, whereby the supplied electric power becomes smaller. Therefore, it is advantageously possible to obtain a comparatively stable rotational speed with respect to a change in load.

If the output of the induction coil 11 in FIG. 9 and FIG. 4(a) is made smooth to a direct current by using diodes and capacitors, as shown in FIG. 9, the output of the terminal 11e is proportional to the rotational speed.

When the output of the terminal 11e is used as a speed signal to compare it with a preset speed, and an average current is controlled by the known PWM control, it is possible to carry out a constant-speed control. If the circuit shown in FIG. 10 is attached to the apparatus of the present invention, it is possible to automatically stop the apparatus to prevent burning when the motor fan is overloaded due to an accident during the operation.

Figure 10:
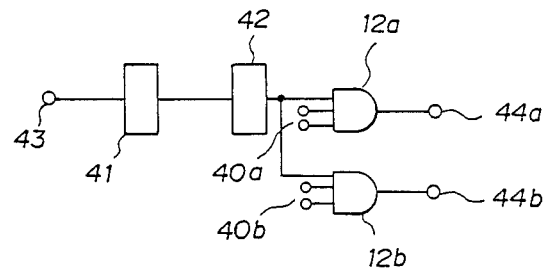
FIG. 10 is a circuit for protecting overloading.

The output of the comparator 11b or 11c in FIG. 9 is applied to a terminal 43 shown in FIG. 10, and a differentiated pulse is input to a monostable circuit 42 through a differentiation circuit 41.

The output pulse (having a width of about 0.5 second) of the monostable circuit 42 is input to the AND circuits 12a and 12b.

The AND circuits 12a and 12b are the same as those represented by the same reference numerals in FIG. 9, and the two inputs of a terminal 40a indicate the two inputs in FIG. 9 and the two inputs of a terminal 40b also indicate the two inputs in FIG. 9.

The outputs of terminals 44a and 44b are input to the bases of the transistors 14a, 14b and the transistors 14c and 14d, respectively, in FIG. 9.

When there is an output of the monostable circuit 42, the AND circuits 12a and 12b operate completely in the same way as those in FIG. 9, but when the monostable circuit 42 delivers no output, the level of the outputs of the AND circuits 12a and 12b becomes low, whereby the transistors 14a, 14b, 14c and 14d are turned off and the motor is stopped.

At the time when the power source is turned on, since the motor has not yet been rotated, the voltage is not induced to the coil 11, so that the outputs of the comparators 11b and 11c reaches a high level, and either of the outputs is supplied from the terminal 43 to operate the monostable circuit 42 through the differentiation circuit 41. As a result, the motor is started, and when the induced output of the coil 11 exceeds the levels 16a and 16b in FIG. 6(a), the outputs of the comparators 11b and 11c are inverted alternately, thereby maintaining the operation of the monostable circuit 42.

Thus, the motor is driven by the outputs of the terminals 44a and 44b. However, if the motor is stopped due to overload, since the output of the monostable circuit 42 is lowered to a low level within 0.5 second, the transistors 14a, 14b, ... in FIG. 9 becomes non-conductive, thereby preventing burning.

When the cause of the accident is eliminated and the power source is turned on again, it is possible to resume the operation.

As is clear from the above explanation, the induction coil 11 is characterized in that it not only has a function of a position detecting signal but also conducts various operations such as constant-speed control and overload stopping.

Only one Hall element 8 which constitutes a magnetoelectric converting element suffices for the apparatus of the present invention.

Figure 11:
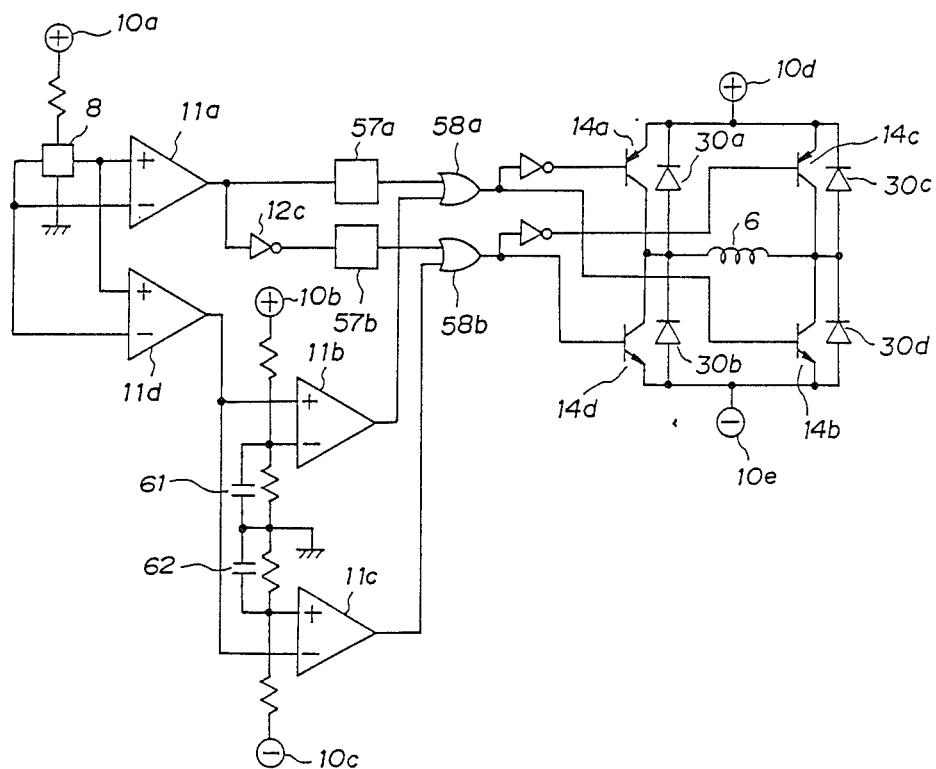
FIG. 11 is a circuit for energizing and controlling an armature coil in the embodiment shown in FIG. 6(c)

The details will be explained with reference to FIG. 11, which shows still another embodiment of the present invention. In FIG. 11, the output of the Hall element 8 is input to the comparator 11a and a differential amplifier 11d. The output of the comparator 11a is indicated by the curve 15a, 15b of the time chart in FIG. 6(c), and the output of the differential amplifier 11d is indicated by the curve 49 in FIG. 6(c). The output of the comparator 11a is input to a monostable circuit 57a, and the output obtained by inverting the output of the comparator 11a by the inverter 12c is input to a monostable circuit 57b. The monostable circuits 57a and 57b are operated by the rise of the respective input signals. The outputs thereof are indicated by the curve 50a, 50b and the curve 51a, 51b, respectively, in FIG. 6(c). The comparator 11b compares the potential obtained by partially dividing a positive power source 10b and the output of the differential amplifier 11d, and supplies the output indicated by the curve 52a, 52b in FIG. 6(c). The comparator 11c compares the potential obtained by partially dividing a negative power source 10c and the output of the differential amplifier 11d, and the output thereof is indicated by the curve 53a, 53b in FIG. 6(c). An OR circuit 58a outputs the OR of the outputs of the monostable circuit 57a and the comparator 11b, and an OR circuit 58b outputs the OR of the outputs of the monostable circuit 57b and the comparator 11c The outputs of the OR circuits 58a and 58b drive the armature coil 6 in the same structure as that shown in FIG. 9, and explanation thereof will be omitted.

Capacitors 61 and 62 are connected in parallel to the voltage dividers of the positive and negative power sources 10b and 10c, respectively. Therefore, since the capacitors 61 and 62 maintain a short-circuit state for a predetermined time after turning on the power source, the inversion input terminal of the comparator 11b and the non-inversion input terminal of the comparator 11c have almost no potential. The dotted lines 49a and 49b in FIG. 6(c) indicate the potentials of the inversion input terminal of the comparator 11b and the non-inversion input terminal of the comparator 11c, respectively, at this time. The outputs of the comparators 11b and 11c have a width of about 180 degrees, as indicated by the reference numerals 52a and 53a in FIG. 6(c).

Figure 6C:
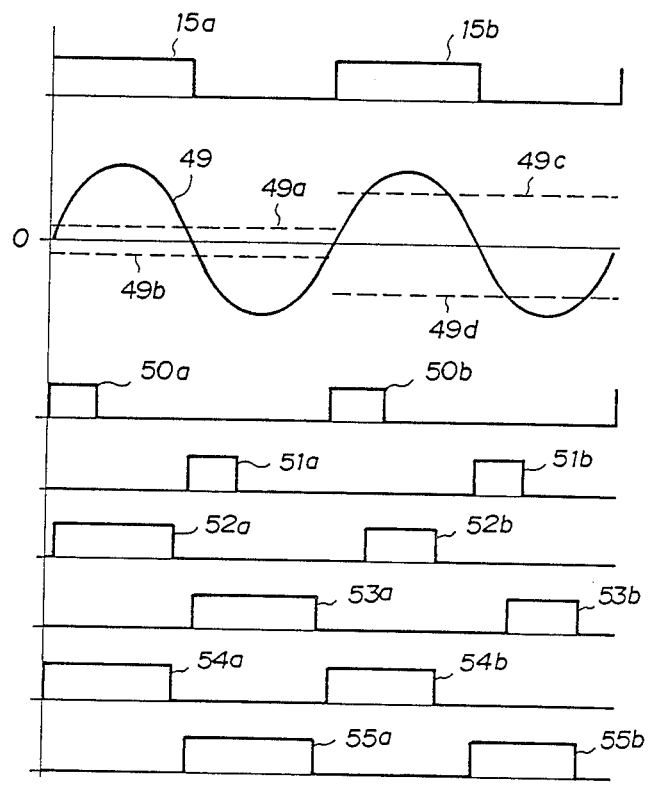

The dotted lines 49c and 49d in FIG. 6(c) indicate the potentials of the inversion input terminal of the comparator 11b and the non-inversion input terminal of the comparator 11c, respectively, when the capacitors 61 and 62 are charged after turning on the power source. The comparators 11b and 11c at this time output signals of a narrow width, as indicated by the reference numerals 52b and 53b in FIG. 6(c). Since the monostable circuits 57a and 57b output the signals 50a, 50b, 51a, and 51b, the OR circuits 58a and 58b for driving the armature coil output the signals 54a, 54b, 55a and 55b in FIG. 6(c). In other words, at the time of turning on the power source, the armature coil is energized by about 180 degrees, as shown by the signals 54a and 55a, thereby facilitating the start-up thereof by the cogging torque, and a predetermined time after the start-up, the energizing angle becomes 140 to 150 degrees, as as shown by the signals 54a and 55a, thereby increasing the efficiency. In both cases, energization is started at the initial stage of the position detection of the comparator 11a by virtue of the operation of the monostable circuits 57a and 57b with the lapse of time the energizing angle is reduced, and 30 to 40 degrees are cut off at the last stage. Thus, this embodiment has the same effect as that of the embodiment shown in FIG. 9.

A further embodiment will be explained with reference to FIG. 4(b). The same reference numerals denote the same elements as those in the above-described embodiments, and explanation thereof will be omitted.

Figure 4B:
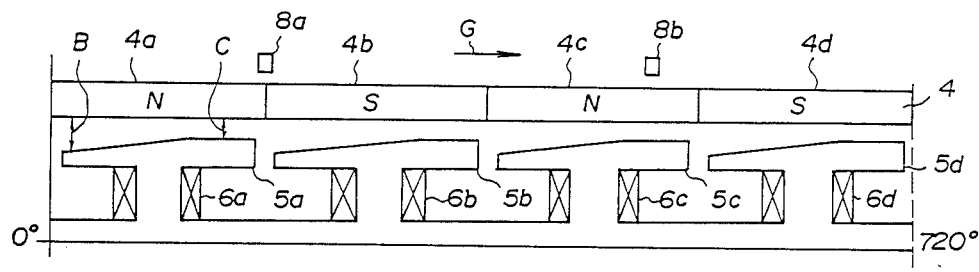

FIG. 4(b) is a development of 720 degrees (an electrical angle) of a motor according to this embodiment.

The salient poles 5a, 5b, . . . the armature coil members 6a, 6b, . . . Hall elements 8a and 8b face the respective members and the magnet rotor 4. The Hall elements 8a and 8b serve as position detecting elements, and are fixed to the fixed armature side. The outputs of the Hall elements 8a, and 8b are obtained by the magnetic flux of the magnet rotor 4. The phase difference between the Hall elements 8a and 8b is substantially 30 to 40 degrees by an electrical angle.

Figure 7:
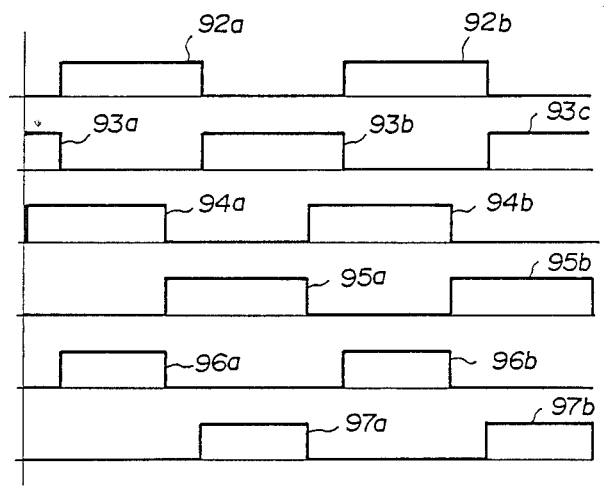
FIG. 7 is a time chart of position detecting signals and energizing signals in the embodiment shown in FIG. 4(b)
Figure 12:
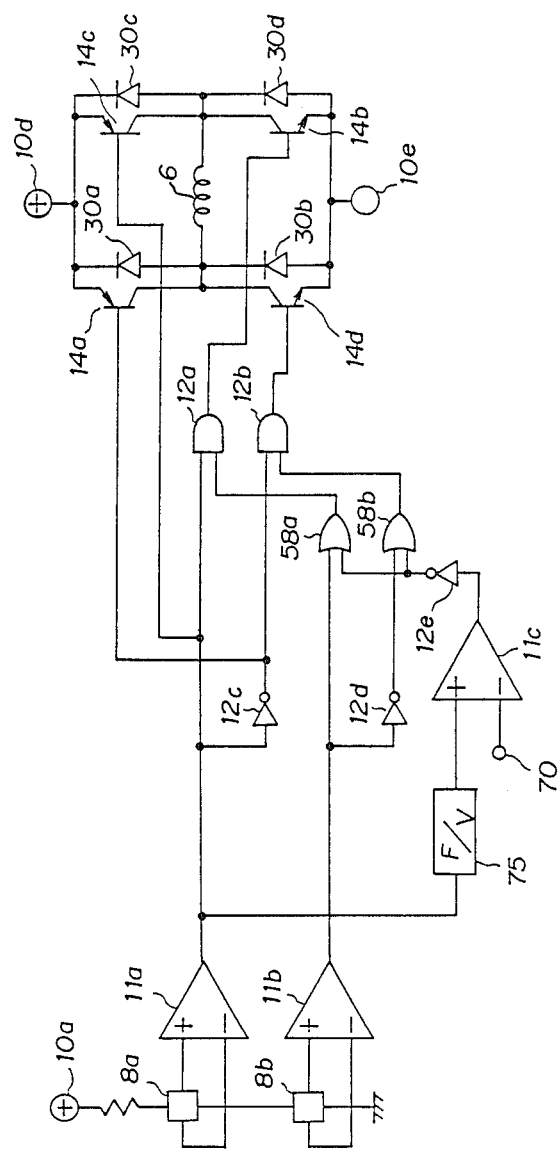
FIG. 12 is a circuit for energizing and controlling an armature coil in the embodiment shown in FIG. 4(b)

In FIG. 12, the outputs of the Hall elements 8a and 8b (those represented by the same reference numerals in FIG. 4(b)) which are energized by a DC power source 10a are obtained from the N and S poles of the magnet rotor 4, and the output voltage of the comparators 11a and 11b are indicated by the curve 92a, 92b, . . . and the curve 94a, 94b, . . . , respectively, in FIG. 7. The phase of the curve 94a, 94b, . . . goes ahead of that of the curve 92a, 92b, . . . by 40 degrees by an electrical angle.

Inverters 12c and 12d invert the outputs of the comparators 11a and 11b, respectively, the output of the inverter 12c being indicated by the reference numerals 93a, 93b, and 93c, and the output of the inverter circuit 12d by 95a and 95b. When the rotational speed of the rotor 2 is low and the output voltage of a frequency-voltage converter 75 is too low to produce a preset speed signal which is input to an insertion input terminal 70 of the comparator 11c, the comparator 11c supplies a low level output, while an inverter 12e supplies a high level output. OR circuits 58a and 58b supplies high level outputs irrespective of other inputs. The AND circuit 12a outputs the AND of the output of the OR circuit 58a and the comparator 11a, and the AND circuit 12b outputs the AND of the output of the OR circuit 58b and the inverter 12c. At this time, since both outputs of the OR circuits 58a and 58b are at a high level, the outputs of the AND circuits 12a and 12b are the same as those of the comparator 11a and the inverter 12c, respectively. Since the transistor bridge 14a, 14b, 14c and 14d is driven by these outputs, the armature coil 6 is energized alternately by an electrical angle of 180 degrees. Thus, the armature coil 6 is energized by 180 degrees at the starting time when the number of rotation is low, and the start-up of the armature coil 6 is facilitated by th cogging torque.

When the rotational speed of the rotor 2 is increased by acceleration after the start-up and exceeds the rotational speed which corresponds to the preset speed signal which is applied to the terminal 70, the comparator 11c supplies a high level output. The inverter 12e inverts this output and supplies a low level output, and the outputs of the OR circuits 58a and 58b become the same outputs of the comparator 11b and the inverter 12d, respectively. In other words, the frequency-voltage converter 75, the comparator 11c and the inverter 12e constitute a control circuit for detecting the speed of the rotor 2 and controls the signals which pass the OR circuits 58a and 58b. Therefore, the AND circuits 12a and 12b output the ANDs of the outputs of the comparator 11b and the inverter 12d which have passed the OR circuits 58a and 58b respectively, as they are, and the outputs of the comparator 11a and the inverter 12c, respectively.

The AND circuit 12a outputs the AND of the signals represented by the reference numerals 92a, 92b and the signal represented by 94a, 94b as the signals represented by 96a, 96b, and the AND circuit 12b outputs the AND of the signals represented by the reference numerals 93a, 93b and the signals represented by 95a, 95b as the signals represented by 97a, 97b, in FIG. 7. The latter signals have a narrower width than the energizing signal at a low speed (e.g., the signals 92a, 92b) by about 40 degrees at the latter part, thereby preventing the flow of unavailable current and increasing the efficiency to about 60%.

A still further embodiment of an apparatus of the present invention in which only one Hall element 8 is used will be explained in detail with reference to FIG. 13.

Figure 13:
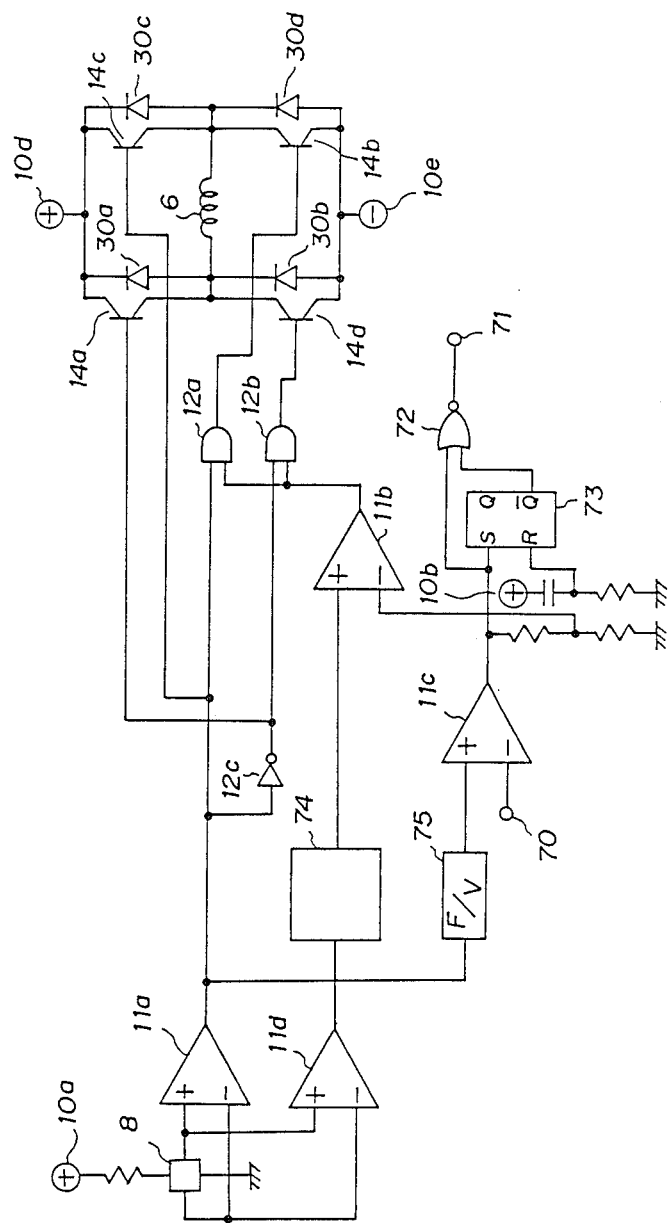
FIG. 13 is a circuit for energizing and controlling an armature coil in the embodiment shown in FIG. 8(a)

In FIG. 13, the output of the Hall element 8 is input to the comparator 11a and the differential amplifier 11d, and the output of the differential amplifier 11d is connected to the non-inversion input terminal of the comparator 11b through an absolute value circuit 74. The output of the comparator 11a and the output of the comparator 11b together with the signal inverted by the inverter 12c are input to the AND circuits 12a and 12b, respectively, and the outputs of the AND circuits 12a and 12b together with the output of the comparator 11a and the output inverted by the inverter 12c drive the transistor bridge 14a, 14b, 14c and 14d, as shown in FIG. 13. The output of the comparator 11a is converted to a voltage which is proportional to the frequency by the frequency-voltage converter (F/V converter) 74, and is input to the non-inversion input terminal of the comparator 11c. The output of the comparator 11c is divided into an input to the non-inversion input terminal of the comparator 11b and the input to the S terminal(-set input terminal) of an S-R flip.flop 73

Figure 8:
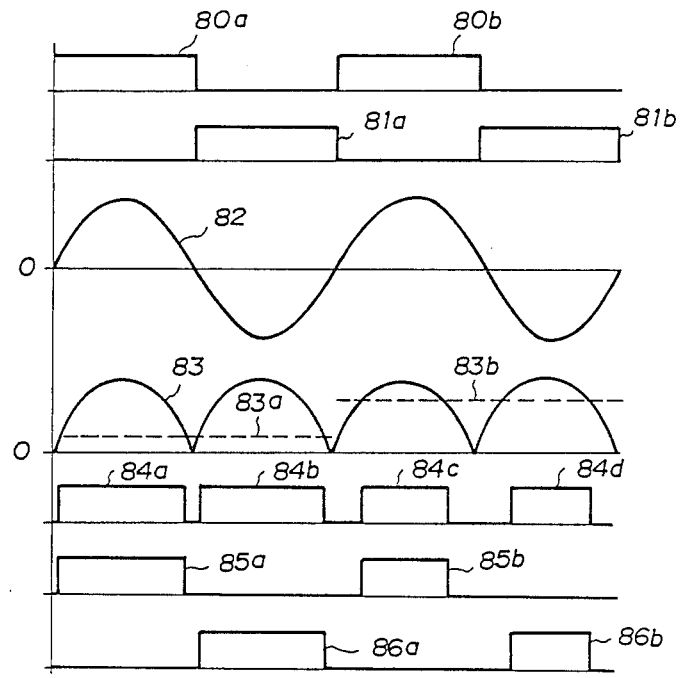
FIGS. 8(a) and 8(b) are time charts of position detecting signals and energizing signals in further embodiments.
Figure 8:
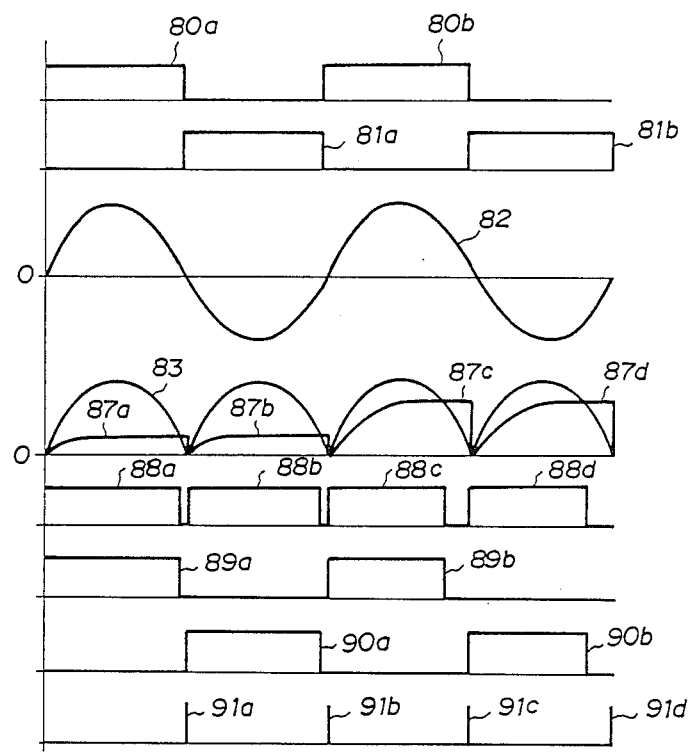

Referring to the time chart in FIG. 8(a), the output of the comparator 11a is indicated by the reference numerals 80a and 80b, while the output of the differential amplifier 11d is indicated by the reference numerals 81a, 81b. The frequency-voltage converter 75 to which the output of the comparator a is input converts the frequency to a voltage by the signals 80a, 80b generated by the rotation of the rotor. If the voltage value exceeds the preset rotational frequency input voltage which is input to the terminal 70 from the outside, the comparator 11c supplies a high level output. The comparator 11b compares the output of the absolute value circuit 74 which is indicated by the reference numeral 83 in FIG. 8(a) and the divided outputs of the comparator 11c which are indicated by the dotted lines 83a and 83b, and supplies the output indicated by the reference numerals 84a, 84b, 84c and 84d.

At the time of the start-up, since the rotor 2 is rotated at a rotational speed substantially the same speed for stopping the rotor 2, almost no output is supplied from the frequency-voltage converter 75, and the potential thereof is lower than that of the terminal 70 for the preset rotational frequency input, so that the comparator 11c supplies a low level output, while the comparator 11b compares the divided output 83a and the output 83 of the absolute value circuit 74, and outputs the signals 84a and 84b. The AND circuits 12a and 12b output the AND of the output of the comparator 11b and the output of the comparator 11a, and the AND of the output of the comparator 11b and the inverted output of the inverter 12c, respectively, which are represented by the reference numerals 85a and 85b, respectively, in FIG. 8(a). Thus, the armature coil 6 is alternately energized by the transistor bridge 14a, 14b, 14c and 14d, which is driven by the AND circuits 12a, 12b, the comparator 11a and the inverter 12c. At this time, since the comparator 11 supplies a low level output, the energizing width is as large as about 180 degrees, thereby facilitating the starting of the armature coil 6 by virtue of the cogging torque. When the rotational frequency and, hence, the output of the frequency-voltage converter 75 is increased to not less than the preset rotational frequency input of the terminal 70, the comparator 11c supplies a high level output. At this time, the inverted input of the comparator 11b which is indicated by the dotted line 83b, is also raised, and the comparator 11c outputs the signals 84c and 84d. The AND circuits 12a and 12b which drive the transistor bridge supplies the outputs 85b and 86b.

In other words, at the time of start-up, the energizing angle is about 180 degrees, and when the rotational frequency exceeds the preset rotational frequency, the energizing width is reduced to 120 to 140 degrees, thereby enhancing the efficiency.

When a positive voltage is applied to the positive power source 10b at the time of turning on the power source, a differentiated pulse is input to the R terminal (reset input terminal) of the S-R flip.flop 73, thereby resetting the S-R flip.flop 73, and the output Q is lowered to a low level while the output $\overline{Q}$ reaches a high level. When the armature coil 6 is energized and started, and the speed of the rotor 2 increases to not less than a preset speed, the output of the comparator 11c rises to a high level and is input to the S terminal of the S-R flip.flop 73, which is set and the output Q rises to a high level while the output $\overline{Q}$ is lowered to a low level. If an abnormality takes place thereafter and the rotational frequency of the rotor is lowered below a preset rotational frequency due to the lowering of the rotational speed or the stopping of the rotor 2, the comparator 11c supplies a low level output, but since the S-R flip.flop 73 keeps the current state, the output of a NOR circuit 72 reaches a high level. As a result, an alarm signal is output from a terminal 71, so that it is possible to detect the abnormal state from the outside.

Figure 14:
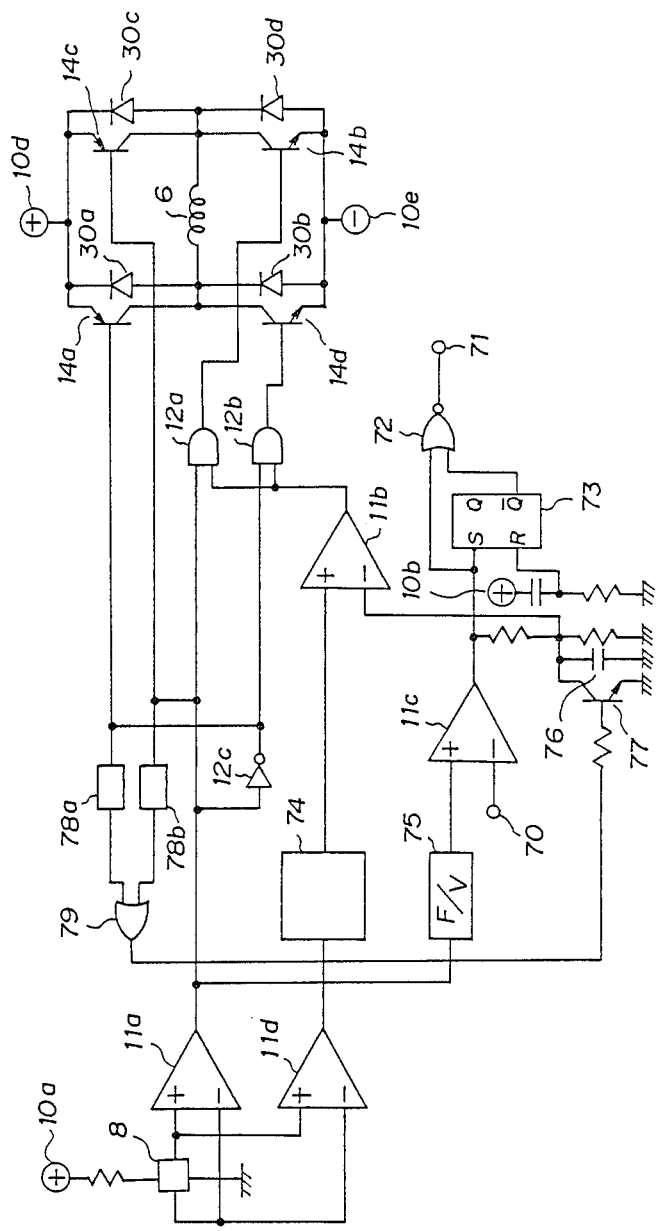
FIG. 14 is a circuit for energizing and controlling an armature coil in the embodiment shown in FIG. 8(b).

A still further embodiment will be explained with reference to FIG. 14. This embodiment is different from the embodiment shown in FIG. 13 in that a capacitor 76, a transistor 77, differentiation circuits 78a. and 78b and an OR circuit 79 are added thereto. As is clear from the signals 85a, 85b, 86a and 86b of the time chart in FIG. 8(a), the rise of energization is behind the rise of the position detecting signals 80a, 80b, 81a and 81b of the Hall element 8, so that the initial energization is not carried out in the embodiment shown in FIG. 13. Therefore the output torque is in short at a high-speed rotation, which point is improved by this embodiment. Explanation of this embodiment will be made hereinunder with reference to the time chart in FIG. 8(b) The same reference numerals as those in FIG. 8(a) represent the same elements and outputs, explanation thereof being omitted.

The differentiation circuits 78a and 78b differentiate the outputs of the comparator 11a and the inverter 12c, and the OR circuit 79 produces the pulses represented by the reference numerals 91a, 91b, 91c and 91d in FIG. 8(b). These pulses make the transistor 77 conductive and discharge the capacitor 76. When the rotational speed of the rotor 2 is under a preset rotational speed, the output of the comparator 11c is at a low level, and the capacitor 76 is hardly charged, the voltage thereof being indicated by the reference numerals 87a and 87b. The comparator 11b compares the voltage of the capacitor 76 with the output of the absolute value circuit 74, namely, the voltage 83 in FIG. 8(b), and supplies the output 88a, 88b. The outputs of the AND circuits 12a and 12b are alternately divided as indicated by the reference numerals 89a and 90a, respectively, and the transistor bridge 14a, 14b, 14c and 14d energizes the armature coil 6 by about 180 degrees. Therefore, the starting of the armature coil 6 is facilitated by virtue of the cogging torque.

When the rotational speed of the rotor 2 is increased and exceeds the preset rotational speed, since the comparator 11c supplies a high level output, the charged voltage of the capacitor 76 is also raised, as indicated by the reference numerals 87c and 87d, and the comparator 11b supplies the outputs indicated by the reference numerals 88c and 88d. The outputs of the AND circuits 12a and 12b are alternately divided as indicated by the reference numerals 89b and 90b, respectively, and the transistor bridge 14a, 14b, 14c and 14d energizes the armature coil 6 by about 120 degrees, in other words, about 40 degrees are cut off at the last stage. Thus, the efficiency is increased to about 60%.

Whenever the pulses 91a, 91b, 91c and 91d output form the OR circuit 79 when the position detecting output of the comparator 11a is changed, the capacitor 76 is discharged. Therefore, the voltage of the capacitor 76 is charged every time in conformity with the charging curve 87a, 87b, 87c and 87d, which has a time constant. Consequently, the voltage of the capacitor 76 never exceeds the output curve 83 of the absolute value circuit 74 at the initial charging stage, and the output of the comparator 11b is cut off only at the trailing edge. In this respect, this embodiment improves the embodiment shown in FIG. 13. The operations of the S-R flip.flop 73, the NOR circuit 72 and the terminal 71 are the same as those in the embodiment shown in FIG. 13 and output an alarm signal when the rotational frequency of the rotor 2 is lowered or the rotor 2 is stopped after the start-up.

As described above, according to the present invention, it is possible to produce a flat and small-diameter fan motor for cooling electronic machines or other uses. The structure of the apparatus of the present invention enables the production of a single-phase semiconductor motor which is light in weight and cheap in manufacturing cost. In the motor of the present invention, it is possible to energize the armature coil by 180 degrees, thereby ensuring the start-up by virtue of the cogging torque, and to raise the efficiency by cutting off the current at the last energizing stage after the start-up. It is also possible to attach a device for preventing overloading and a constant-speed controller As is obvious from the circuit structure, since the number of the capacitors to be attached to the IC from the outside is small, it is possible to compose a cheap electric circuit.

Since the rotor has a special structure, as shown in FIG. 1, the space occupied by the radial fan is effectively utilized and the distance between the bearings is increased, so that the life can be prolonged.

Furthermore, by varying the configuration of the outer housing, it is possible to control air stream.

Thus, there is provided a motor fan in accordance with the present invention which has the advantages discussed above. The embodiments described are intended to be merely exemplary and those skilled in the art will be able to make variations and modifications in them without departing from the spirit and scope of the invention. All such modifications and variations are contemplated as falling within the scope of the claims.

What is claimed is:

1. A single-phase semiconductor motor fan comprising:
   a cylinder implanted on a substrate;
   a fixed armature with the central portion thereof being fitted over the lower end of the outer periphery of said cylinder and having a plurality of salient poles arranged at a regular pitch;
   a plurality of single-phase armature coil members mounted on said armature and wound around the respective salient poles;
   bearings inserted into and fixed on the inner periphery of both ends of said cylinder;
   a rotary shaft rotatably supported by said bearings;
   a cup-shaped rotor having a protruding portion at the center of the upper surface thereof such that the center of said protruding portion is fixed on the upper end of said rotary shaft;
   an annular magnet which is fixed on the inner surface of said rotor and magnetized into N and S poles of the same number and with the same pitch as those of said salient pole surfaces with a space therebetween;
   a radial fan composed of a plastic cylinder which is fitted over said protruding portion of said rotor and a plurality of plastic plates which extend radially outwardly of said plastic cylinder, the height of said radial fan not exceeding the height of said protruding portion of said rotor;
   a position detecting element which detects the position of the magnet of said rotor and produces a single-phase position detecting signal;
   an energization controlling circuit for energizing said armature coil and producing a unidirectional torque by said position detecting signal; and
   a self-starting means for producing an output torque at a dead point by virtue of a cogging torque.

2. A single-phase semiconductor motor fan according to claim 1, wherein the outer peripheral portion of the upper surface of said radial fan is closed so that air is taken in through the central portion and released radially to said outer peripheral portion.

3. A single-phase semiconductor motor fan according to claim 1, wherein the outer peripheral portions of the upper surface and side surface of said radial fan are covered, and an opening portion and a guide plate for guiding air stream from said opening portion in a predetermined direction are provided at said side surface, so that air is taken in through the central portion and released radially from said opening portion in a predetermined direction.

4. A single-phase semiconductor motor fan according to claim 1, wherein said substrate is fixed onto the central portion of a bottom plate of a heat sink, and heat dissipation fins are disposed such that the air stream which flows out of said radial fan passes windingly among said heat dissipation fins of said heat sink.

5. In an outwardly rotating type single-phase semiconductor motor having a fixed armature provided with a plurality of salient poles arranged at a regular pitch and single-phase armature coil members wound around the respective salient poles, and a cup-shaped magnet rotor provided with field poles on the inside thereof such that said field poles and said salient poles rotate in a state of facing each other, said single phase semiconductor motor comprising:
   a position detecting device which detects the rotating position of said magnet rotor and produces a position detecting signal;

an energizing circuit composed of a transistor circuit including said armature coil members which are connected to each other in series or in parallel, and at least two transistors for energizing said armature coil members;

a controlling circuit for controlling said energizing circuit for energizing said armature coil members reciprocatingly such that each of said armature coil members is energized by an electrical angle of 180 degrees at the time of start-up and said armature coil member is energized by an electrical angle of about 150 degrees by cutting off the energization by an electrical angle of 30 degrees at the last energizing stage after the start-up; and a self-starting means for producing an output torque at a dead point by virtue of a cogging torque.

6. A single-phase semiconductor motor according to claim 5, wherein said position detecting device is composed of a magnetoelectric converting element for detecting the magnetic field of said magnet rotor, and an induction coil which is fixed on a position which is ahead of the position of said magnetoelectric converting element in phase by a predetermined angle and which produces an induction electromotive force by the rotation of said magnet rotor; said controlling circuit is composed of a first comparator for outputting first and second rectangular wave signals when said magnetoelectric converting element is under as N pole and an S pole, respectively, a second comparator for outputting third and forth rectangular wave signals when the amplitude of the output of said induction coil is smaller than a positive predetermined value and larger than a negative predetermined value, respectively, a first AND circuit for outputting the AND of said first and third signals, and a second AND circuit for outputting the AND of said second and fourth signals; said transistor circuit of said energizing circuit being controlled by the output of said first and second AND circuits.

7. A single-phase semiconductor motor according to claim 6, further comprising a speed detecting circuit for commutating and making the output of said induction coil smooth in order to produce an output which is proportional to the rotational speed of said rotor, and a constant-speed controlling circuit which reduces an armature current when the output of said speed detecting circuit exceeds a preset value, and increases the armature current when the output of said speed detecting circuit is less than said preset value.

8. A single-phase semiconductor motor according to claim 6, further comprising a monostable circuit which is set by an electric signal when the power source is turned on, a terminal for inputting a rectangular wave signal which corresponds to the output frequency of said induction coil, and said first and second AND circuits constitute three input terminals; and the output of said monostable circuit is input to a third input terminal of each of said first and second circuits, so that said first and second AND circuits are operated only during the operation of said monostable circuit so as to energize said armature coil.

9. A single-phase semiconductor motor comprising:
a cylinder implanted on a substrate;
a fixed armature with the central portion thereof being fitted over the lower end of the outer periphery of said cylinder and having a plurality of salient poles arranged at a regular pitch;

a plurality of single-phase armature coils mounted on said armature and wound around the respective salient poles;

bearings inserted into and fixed on the inner periphery of both ends of said cylinder;

a rotary shaft;

a cup-shaped rotor with the central portion of the bottom surface thereof being fixed on the upper end of said rotary shaft;

an annular magnet which is fixed on the inner surface of said rotor and magnetized into N and S poles of the same number and with the same pitch as those of said salient poles, said N and S magnetic pole surfaces facing said salient pole surfaces with a space therebetween;

a first position detecting element which is fixed on said fixed armature side in opposition to said magnet at the central part between two adjacent salient poles to detect the position of said rotor and produce a first position detecting signal;

a second position detecting element which is fixed on said fixed armature side at a position deviated from said first position detecting element by a predetermined angle to detect the position of said rotor and produce a second position detecting signal;

an electric circuit for shaping the first and second position detecting signals into rectangular waveforms and to produce first and second rectangular wave position detecting outputs;

a transistor circuit composed of said plurality of armature coils connected to each other in series or in parallel and at least two transistors for energizing said coils;

diodes reversely connected to said transistors in parallel;

a first energizing controlling circuit for alternately conducting said transistor circuit at the initial stage of start-up every time said rotor rotates by an electrical angle of 180degrees in response to said first rectangular wave position detecting output;

an electric circuit for producing a first system position detecting signal with a predetermined width of the output cut off at the last stage after the start-up when said first position detecting element faces the N pole of said magnet and producing a second system position detecting signal with a predetermined width of the output cut off at the last stage when said first position detecting element faces the S pole of said magnet is response to said first and second rectangular wave position detecting outputs;

a second energizing controlling circuit for alternately conducting said transistor circuit by said first system position detecting signal and said second system position detecting signal, respectively, after the start-up; and a means for self-starting said armature coil by virture of a cogging torque.

10. A single-phase semiconductor motor comprising:
a cylinder implanted on a substrate;
a fixed armature with the central portion thereof being fitted over the lower end of the outer periphery of said cylinder and having a plurality of salient poles arranged at a regular pitch;
a plurality of single-phase armature coils mounted on said armature and wound around the respective salient poles;

bearings inserted into and fixed on the inner periphery of both ends of said cylinder;

a rotary shaft;

a cup-shaped rotor with the central portion of the bottom surface being fixed on the upper end of said rotary shaft;

an annular magnet which is fixed on the inner surface of said rotor and magnetized into N and S poles of the same number and with the same pitch as those of said salient poles, said N and S magnetic pole surfaces facing said salient pole surfaces with a space therebetween;

a magnetoelectric converting element which is fixed on said fixed armature side in opposition to the magnetic pole surface of said magnet to detect the position of said rotor and produce a position detecting signal which is proportional to the strength of the magnetic field of said magnetic pole;

a first position detecting device including an electric circuit for producing a row of rectangular wave position detecting signals spaced from each other by a regular pitch of 180 degrees electrical angle and having a width of 180 degrees electrical angle in response to the output of said magnetoelectric converting element;

a second postion detecting device including an electric circuit for producing a row of rectangular wave position detecting signals spaced from each other by a angular pitch of 180 degrees electrical angle and having a width of about 120 to 140 degrees electrical angle;

a transistor circuit composed of said plurality of armature coils connected to each other in series or in parallel and at least two transistors for energizing said coils;

diodes reversely connected to said transistors in parallel;

a first energization controlling circuit for alternately conducting said transistor circuit at the initial stage of start-up by said rectangular wave position detecting signals outputted from said first position detecting device every time said rotor rotates by an electrical angle of 180 degrees;

a second energization controlling circuit for alternately conducting said transistor circuit after the start-up in response to said rectangular wave position detecting signals outputted from said second position detecting device every time said rotor rotates by an electrical angle of 180 degrees and for cutting off the energization of said armature coils by a predetermined angle at the last stage after the start-up; and a means for self-starting said rotor by virtue of a cogging torque.

11. A single-phase semiconductor motor according to claim 10, wherein said first energization controlling circuit alternately conducts said transistor circuit at the initial stage of the start-up by said rectangular were position detecting signals outputted from said first position detecting device every time said rotor rotates by an electrical angle of 180 degrees; said second position detecting device includes an electric circuit for producing a first system position detecting signal with a predtermined width of the output cut off at the last stage when said magnetoelectric converting element faces the N pole of said magnet and a second system position detecting signal with a predetermined width of the output cut off at the last stage when said magnetoelectric converting element faces the S pole of said magnet; said second energization controlling circuit conducts said transistor circuit by said first system position detecting signal and said second system position detecting signal after the start-up; and said self-starting means produces an output torque at a dead point by virtue of a cogging torque.

12. A single-phase semiconductor motor according to claim 10, further comprising: a speed detecting circuit for detecting the rotational speed of said rotor; an electric circuit for producing different first and second electric signals before and after said rotational speed reaches a predetermined value, respectively; and an energization controlling circuit for controlling and starting said transistor circuit by selecting the output signal of said first position detecting device by said first electric signal and for controlling sard transistor circuit after the start-up by selecting the output signal of said second position detecting device by said second electric signal, thereby energizing and controlling said armature coils.

13. A single-phase semiconductor motor according to claim 10, further comprising an electric circuit for producing different first and second electric signals before and after a predetermined time has elapsed from the start-up; and an energization controlling circuit for controlling and starting said transistor circuit by selecting the output signal of said first position detecting device by said first electric signal and for controlling said transistor circuit by selecting the output signal of said second position detecting device by said second electric signal, thereby energizing and controlling said armature coils. torque.

* * * * *

UNITED STATES PATENT AND TRADEMARK OFFICE
CERTIFICATE OF CORRECTION

PATENT NO. : 4,755,728
DATED : July 5, 1988
INVENTOR(S) : Itsuki BAN

It is certified that error appears in the above-identified patent and that said Letters Patent is hereby corrected as shown below:

Col. 10, line 44, "th" should read --the--.

Col. 11, line 32, "11ais" should read --11a is--;

line 36, "a" should read --11a--.

Col. 12, line 55, "78aand 78bdifferentiate" should read --78a and 78b differentiate--.

Col. 13, line 20, "91cand" should read --91c and--.

Col. 14, line 21, "pole" should read --poles-- and after --poles-- insert --said N and S magnetic pole surfaces facing said salient pole--;

line 33, after "coil" insert --members--;

line 34, delete "by" insert --in response to--.

UNITED STATES PATENT AND TRADEMARK OFFICE
CERTIFICATE OF CORRECTION

PATENT NO. : 4,755,728
DATED      : July 5, 1988
INVENTOR(S): Itsuki BAN

It is certified that error appears in the above-identified patent and that said Letters Patent is hereby corrected as shown below:

Col. 15, line 29, "as" should read --an--;

Col. 16, line 40, "180degrees" should read --180 degrees--;

line 50 "is" should read --in--.

Col. 17, line 30, "angular" should read --regular--.

Col. 18, line 8, "were" should read --wave--;

line 13, "predt-" should read --predet--;

line 35, "sard" should read --said--;

line 51, delete "torque.".

Signed and Sealed this

Eighteenth Day of October, 1988

Attest:

DONALD J. QUIGG

Attesting Officer

Commissioner of Patents and Trademarks